Oct. 6, 1970  C. D. HOPE-GILL  3,531,934
GAS TURBINE POWER PLANT
Filed Oct. 28, 1968  3 Sheets-Sheet 3
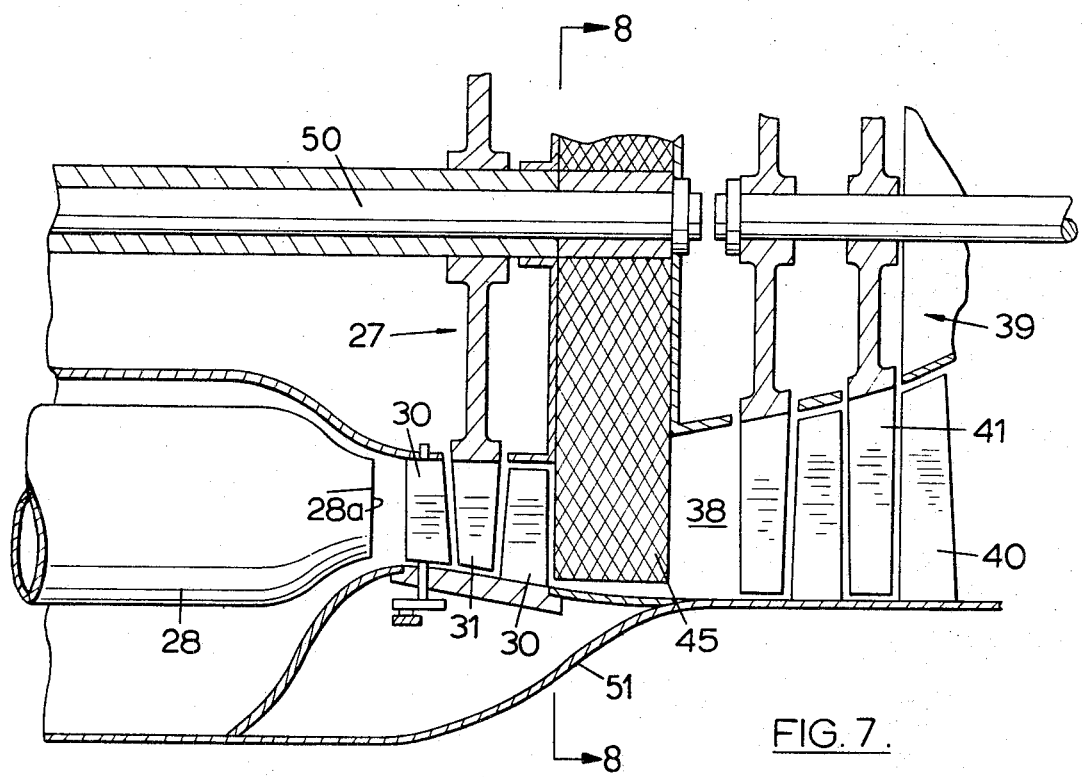
FIG. 7.
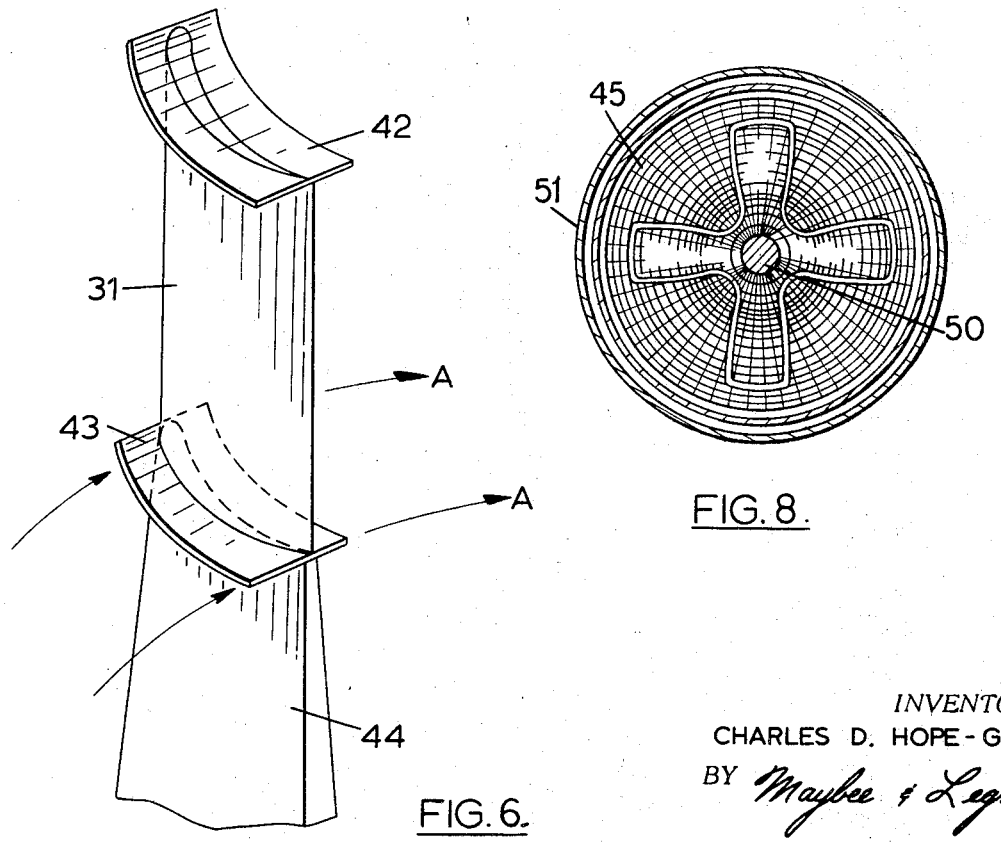
FIG. 8.
FIG. 6.
INVENTOR.
CHARLES D. HOPE-GILL
BY Maybee & Legris
ATTORNEYS 3,531,934
GAS TURBINE POWER PLANT
Charles David Hope-Gill, 1580 Jamaica Square,
North Tonawanda, N.Y. 14120
Filed Oct. 28, 1968, Ser. No. 771,199
Claims priority, application Great Britain, Nov. 7, 1967,
50,525/67
Int. Cl. F02c 7/02
U.S. Cl. 60—39.04                                    9 Claims

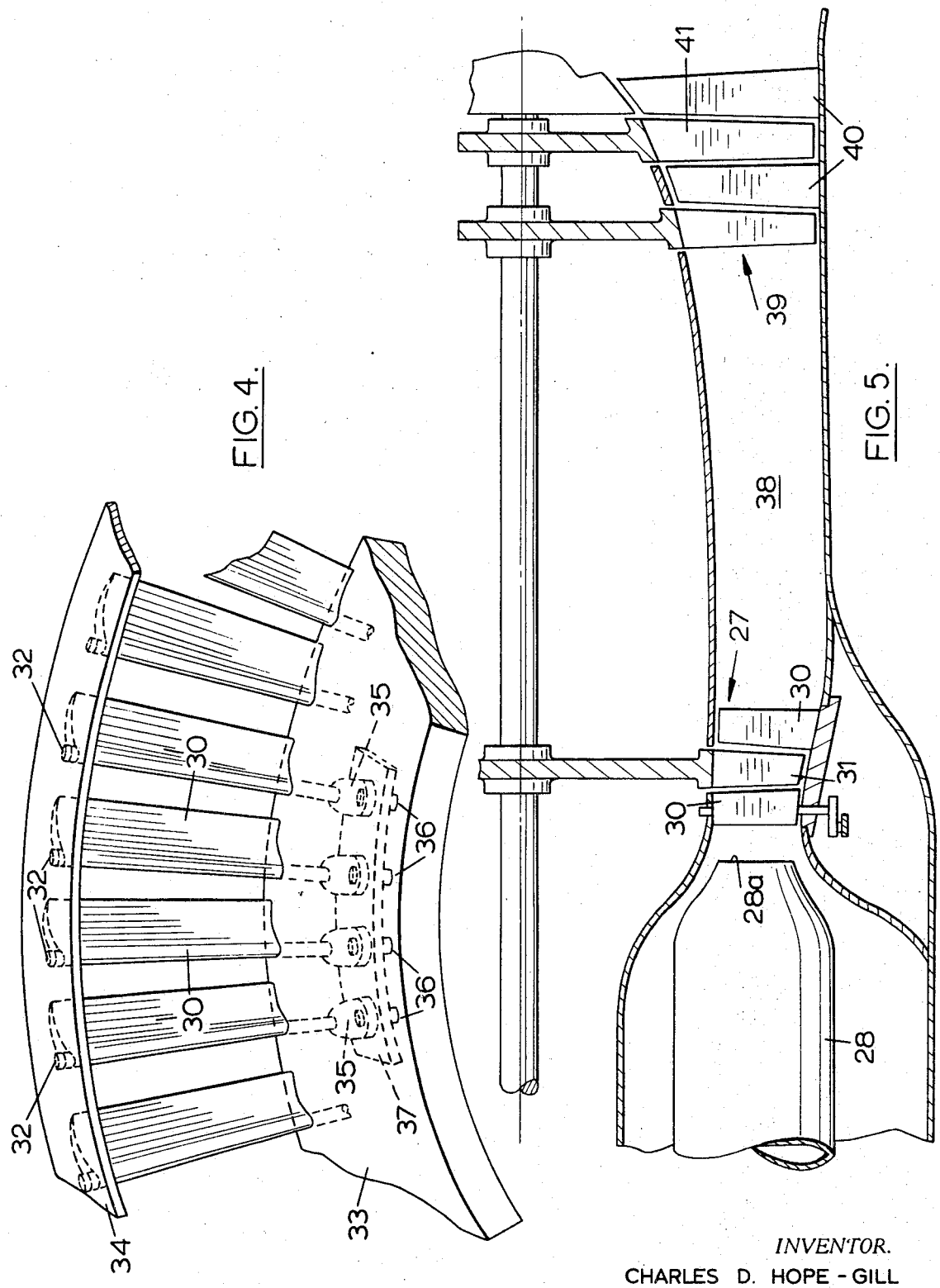

ABSTRACT OF THE DISCLOSURE

In a gas turbine driven by a high temperature working fluid, a lower temperature gas is delivered to the turbine simultaneously with the high temperature gas, the moving parts of the turbine, such as the rotor blades, being successively presented to the two gases alternately so that the means temperature of the moving parts is less than that of the high temperature gas.

BACKGROUND OF THE INVENTION

This invention relates to a power plant of the kind including a gas turbine wherein energy and/or enthalpy is extracted from a working gas to perform mechanical work.

The turbine referred to above is essentially one having a stationary structure or stator, and a movable structure or rotor blades.

One important application of the invention is to gas turbine power plant, in which a heated gas is expanded in one or more turbines. It is well known that the thermodynamic efficiency of a turbine is dependent on the temperature of the working fluid prior to its expansion in the turbine, and for maximum efficiency, this temperature should be as high as possible. In the case of a gas turbine particularly, the temperature of the working gas is limited by the maximum temperature to which the turbine blades can be exposed under stress, since if this temperature is exceeded the blades are subject to excessive creep and other modes of failure associated with high temperatures and stresses.

It is the primary object of the present invention to provide a novel method of operating a power plant of the kind referred to, whereby to increase its thermodynamic efficiency.

A specific object of the invention according to one of its aspects, is to provide a method of operating a gas turbine engine, which permits a higher temperature of all or part of the working fluid than would otherwise be possible, so as to achieve a higher thermodynamic efficiency.

SUMMARY OF THE INVENTION

The invention provides a turbine power plant including a bladed turbine having a stator and a rotor, and comprising means for supplying a first working fluid to the turbine, and means for supplying a second fluid at a temperature lower than the first to the turbine, the disposition of the fluid supply means being such that each rotor blade is presented to the fluids alternately. The stator blades are arranged so that all, or the greater part, of the work performed on the turbine is performed by the first fluid. Heat exchange means may be provided for effecting a transfer of heat from the first fluid to the second fluid in and/or after the turbine. The exhaust fluids may be delivered to a further turbine stage or energy extractor, with or without reheating, for performing further work.

BRIEF DESCRIPTION OF THE DRAWINGS

Several embodiments of the invention will now be described by way of example with reference to the accompanying drawings, in which:

FIG. 4 shows a detail of the turbine stator in the power plant of FIG. 1;

FIG. 5 shows in sectional elevation a detail of a modified gas turbine power plant having a second turbine stage;

FIG. 6 shows a detail of the rotor blade structure in a preferred embodiment of the invention;

FIG. 7 is a modification of the detail shown in FIG. 5; and

FIG. 8 is a section on line 8—8 in FIG. 7.

DESCRIPTION OF THE PREFERRED EMBODIMENTS

Figure 1:
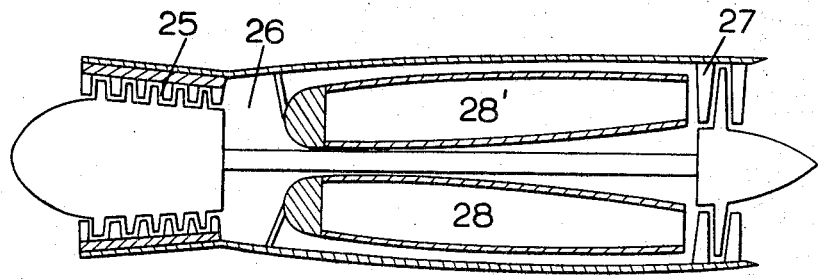
FIG. 1 is a schematic diagram of a gas turbine power plant to which the invention is applied.

Referring now to FIG. 1, the gas turbine power plant shown is mainly of the well known type having a compressor 25, a combustion chamber 26 and a turbine 27 having stator and rotor blades. In the combustion chamber 26 is an array of combustion tubes 28, 28', only two tubes being shown for simplicity. According to the present invention, however, only alternate tubes are fired, (or alternate sets of tubes may be fired), or alternatively all the tubes are fired, significantly more heat being added to alternate tubes, so that the gas delivered to the turbine is delivered in streams at different temperatures $T_2$ and $T_2'$ where $T_2$ is equal to $T_1$, the inlet temperature of the combustion chamber, if no heat is added to the second fluid and where $T_2'$ is a much higher temperature. The stator blades of the turbine 27 are angled so that the angle of incidence of the cooler gas on the rotor blades is such that, the gas being caused to perform a small amount of positive or negative work according to requirements, whereas the angle of incidence of the hotter gas on the rotor blades is such that a significant amount of energy is extracted from the gas to drive the turbine. Provision may be made for adjusting the angle of certain groups of stator blades on which the cooler gas impinges, in order to meet particular operating requirements, as described below.

The gases at different temperatures, which may be partially mixed in the turbine 27, may have a heat exchange device, such as a rotating circular wire mesh, or may be mixed after the turbine exhaust to effect a heat transfer from the hotter to the cooler gas, thereby directly increasing the net kinetic energy of the exhaust gases or increasing the energy available for performing mechanical work, provided that the cooler gases have higher total pressures during the heat transfer process. It is important to note that if the gas is delivered at temperatures $T_2'$ and $T_2$ to alternate regions of the turbine, $T_2'$ being higher than $T_2$, the temperature of the turbine blading will vary in the circumferential direction along the circumferential length in the sawtooth manner illustrated in FIG. 2. The temperature varies about a mean temperature $T_2°$, intermediate between the extreme temperatures $T_2$ and $T_2'$, without reaching either of these extremes. In the case of a conventional gas turbine, the corresponding temperature to which the blading would be continuously exposed is $T_2°$, a total temperature which does not exceed the maximum permissible temperature for the blading under stress. In the present case, however, the total temperature $T_2'$ may be considerably increased beyond $T_2°$ or beyond the maximum temperature which the blades can continuously endure under stress since the blading temperature can be lowered below the maximum gas temperature due to the cooling effect of the cooler gas. It is desirable for the magnitude of the temperature variations to be small. Thus the blading heat capacity should be large and the time associated with the temperature variations should be small.

Figure 3:
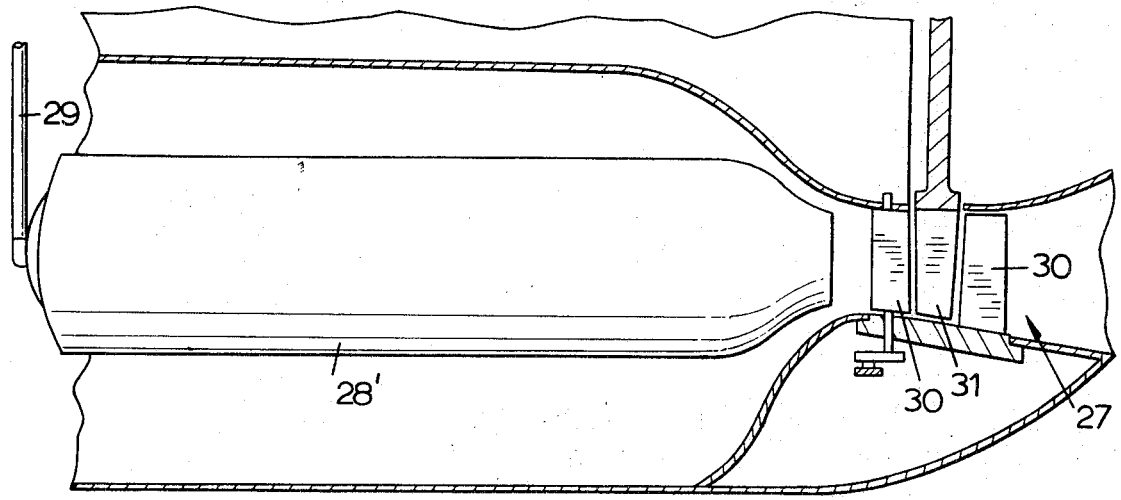
FIG. 3 shows in sectional elevation a detail of the power plant of FIG. 1.

FIG. 3 shows more clearly a detail of the embodiment of FIG. 1. Fuel is fed to the combustion tube 28' via a feed pipe 29, and the gas therefrom is passed through the turbine 27, which has stator blades 30 and rotor blades 31.

The stator blades are arranged in sets, each set corresponding to a particular combustion tube, and the individual sets are adjustable in pitch. Since the sets of stator blades are adjustable, there is a choice as to which of the combustion tubes will have ignition with fuel addition and which will have less or no fuel addition. It may be desired in a particular case to vary the configuration of fired and unfired combustion tubes. In the case of gas issuing from a low temperature tube, the stator blades are rotated so that the work performed on the rotor blades by the cooler gas is decreased from the amount of work performed when the tube is fired. It is therefore possible to have the desired number of gas streams with very high turbine inlet temperatures, and consequently provide the potential for a high overall thermal efficiency by matching the engine configuration to the "momentary" power requirements.

One way of adjusting the angle of a set of stator blades is illustrated in FIG. 4. Each of a set of four blades 30 is mounted on a rotatable pin 32, whose ends are pivoted in inner and outer shrouds 33 and 34. Each pin carries an eccentric 35 which bears a pin 36 located in a recess or otherwise keyed in a plate 37, the plate extending circumferentially over a short arc of the inner shroud 33 and being movable between limits to rotate all four stator blades in unison.

The embodiment of which FIG. 5 shows a part, is basically the same as that of FIGS. 1, 3 and 4. FIG. 5 shows a combustion tube 28 having a discharge nozzle 28a, and a turbine 27 having rotor blades 31 and sets of stator blades 30 which are adjustable for varying the angle of incidence of the gas streams on the blades, and hence the work performed by the gas streams in the turbine. FIG. 5 also shows, however, a mixing and reheating chamber 38, in which the hot and cooler exhaust gases are mixed, and a further turbine 39 having stator blades 40 and rotor blades 41, to which the mixed exhaust gases are passed to perform work. The further turbine 39 might suitably be replaced by a free turbine for obtaining further shaft or mechanical work.

At the exhaust of the turbine 27 there are high total pressure "cooler" gas streams and lower total pressure "hot" gas streams. If the heat exchange is effected by mixing the gas streams (it could alternatively be effected by means of a heat exchanger without mixing), these streams should have a large swirl velocity component to effect mixing over a short axial distance.

In order to reduce the probability of separation at large negative angles of incidence of the cooler gas impinging on and flowing over the rotor blades, the blades may be provided with individual shrouds integral with the blades as shown in FIG. 6. This figure shows a portion of a rotor blade 31 having a shroud 42 at the blade tip and a shroud 43 adjacent to the blade root 44, the arrows A indicating the direction of rotation of the rotor. The arrangement is such that the incident gas stream will tend to become attached to the blade surfaces by the Coanda effect. In this way total pressure losses, or profile losses, arising from large negative angles of incidence are reduced.

FIGS. 7 and 8 illustrate a modification of the structure shown in FIG. 5. Component parts corresponding to those of FIG. 5 are given the same reference numerals and the parts are housed within a housing 51. In this figure the turbine 39 is shown as a free turbine. A rotating wire mesh 45 mounted on a rotor shaft 50 is connected to the rotor of the turbine 27 (although it could alternatively be connected to the rotor of the turbine 39) for promoting efficient mixing of and heat exchange between the hotter and cooler gases.

Although specific examples of the invention have been described, it should be emphasized that the invention is not limited to these examples. The invention essentially resides in the broad concept of increasing the over-all thermodynamic efficiency of gas turbine by delivering to the turbine working gases at different temperatures, the blades of the respective stator regions being angled differently, and the highest temperature preferably being larger than that temperature which some components of the turbine can continuously endure under stress.

A heat exchange process may occur during and/or after the energy and/or enthalpy extraction process under conditions which result in a net increase of convertible available total enthalpy and/or energy of the exhaust gases. One condition, according to theory, is to have the cooler gas being exhausted from the turbine at a higher total pressure than the hotter exhaust gas, heat being subsequently exchanged between the gases to increase the net convertible available total enthalpy without incurring excessive total pressure losses; this may be effected by means of a heat exchanger in the form of a rotating wire mesh.

Figure 2:
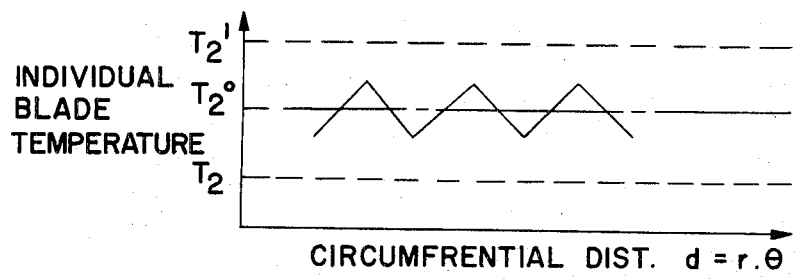
FIG. 2 is a graph showing the temperature distribution at the turbine blades of the power plant of FIG. 1.

It is desirable that the rate of heat flow to the turbine components, such as the rotor blades of the turbine, from the highest temperature flow should be as small as possible. This requires that the rate of increase of the temperature rise as shown in FIG. 2 be as small as possible. Thus the film coefficient and a property of the component material, the heat conductivity, must both be low in order that the rate of temperature increase is small for a given temperature difference. The temperature rise is essentially a function of exponential form (neglecting radiation heating) and approaches linearity for small enough times (as shown in FIG. 2). Some of the heat energy lost from the high temperature flow to the turbine component (rotor blading) can be regained usefully if the cooler flow passing through the turbine has a higher total pressure.

In the case of a turbine, the amount of work performed by the cooler gas in the turbine, or by the turbine on the cooler gas may be controlled by adjustment of the angle of the stator blades or nozzles associated with the cooler gas stream or streams.

In this specification, the term "total pressure" means the quantity:

$$P + \tfrac{1}{2} rV^2$$

where

P is the static pressure
r is the density of the gas, and
V is the velocity of the gas.

The term total enthalpy is the static enthalpy, associated with the static temperature, plus $\tfrac{1}{2}V^2$.

What I claim as my invention is:

1. The method of operating a power plant including a bladed axial flow gas turbine having a stator and a rotor, the rotor having a plurality of circumferentially spaced rotor blades and the stator having a plurality of circumferentially spaced bladed regions through which a working gas is directed onto the rotor blades to drive the rotor, which method comprises:

(a) supplying a first, working gas to a first set of said bladed stator regions at a first temperature,
   (b) supplying a second gas to a second set of said bladed stator regions at a second temperature lower than the first, and
   (c) exhausting the second gas from the turbine at a lower temperature and a higher total pressure than the first gas, the first and second gases being supplied simultaneously to the respective sets of bladed stator regions and, respectively, to different rotor blades in cyclic succession.

2. The method claimed in claim 1, wherein a heat transfer is effected between the gases after being exhausted from the turbine, and the gases are used to drive a second turbine after the heat transfer.

3. The method claimed in claim 1, wherein the first temperature at which the first gas is supplied exceeds the maximum temperature which the rotor can continuously endure under stress, said second gas temperature being such that the mean temperature of the rotor blading is less than said maximum temperature.

4. In a power plant including an axial flow gas turbine having a bladed rotor and a bladed stator, the rotor having a plurality of circumferentially spaced rotor blades and the stator having a plurality of circumferentially spaced bladed regions through which a working fluid is directed axially onto the rotor blades,
   (a) a plurality of combustion tubes spaced around the turbine axis, each combustion tube having a discharge opening cooperating with a respective one of said bladed stator regions,
   (b) said combustion tubes comprising a first set of combustion tubes for supplying high temperature gas streams to a first set of said bladed stator regions, and a second set of combustion tubes streams to a second set of said bladed stator regions,
   (c) the blades of the respective stator regions being angled differently so that the angles of incidence of the high temperature gas streams on the rotor blades are less than the angles of incidence of the lower temperature gas streams on the rotor blades.

5. A power plant according to claim 4, wherein the pitch of the blades of said second set of bladed stator regions is such that the lower temperature gas streams impinge upon the rotor blades at a negative incidence angle.

6. A power plant according to claim 4, including means for selectively firing the combustion tubes to produce the respective high and low temperature gas streams, and means for adjusting the blade pitch of the respective sets of bladed stator regions for varying the angles of incidence of the gas streams upon the rotor blades.

7. In combination with a power plant according to claim 4, wherein the axial flow gas turbine has an exhaust opening from which the high temperature and lower temperature gas streams are exhausted, heat exchange means connected to the exhaust opening for receiving the exhaust gases therefrom and for effecting a heat transfer from the high temperature gas streams to the lower temperature gas streams so as to increase the net available kinetic energy of the exhaust gases, and a second turbine, the second turbine having a bladed stator and a bladed rotor, the second turbine being connected to the heat exchange means to be driven by the exhaust gases after heat transfer between them.

8. The combination claimed in claim 7, wherein the heat exchange means comprises a chamber into which the exhaust gases are discharged from the first turbine and mixed.

9. The combination claimed in claim 8, wherein the second turbine is an axial flow turbine arranged coaxially with the first turbine and coupled thereto by a rotor shaft.

References Cited

UNITED STATES PATENTS

| | | | |
|---|---|---|---|
| 1,982,664 | 12/1934 | Holzwarth | 60—49 |
| 2,403,388 | 7/1946 | Morey et al. | 60—39.19 |
| 2,626,502 | 1/1953 | Lagelbauer | 60—39.19 XR |
| 2,660,858 | 12/1953 | Lichty | 60—39.19 |
| 2,748,564 | 6/1956 | Marchal et al. | 60—39.38 XR |
| 2,845,777 | 8/1958 | Nilsson et al. | 60—39.19 XR |

CARLTON R. CROYLE, Primary Examiner

U.S. Cl. X.R.

60—39.17, 39.18, 39.19, 39.37, 39.5